March 22, 1932. C. P. DUBBS 1,850,745
PROCESS FOR CONVERTING PETROLEUMS
Filed Oct. 24, 1921
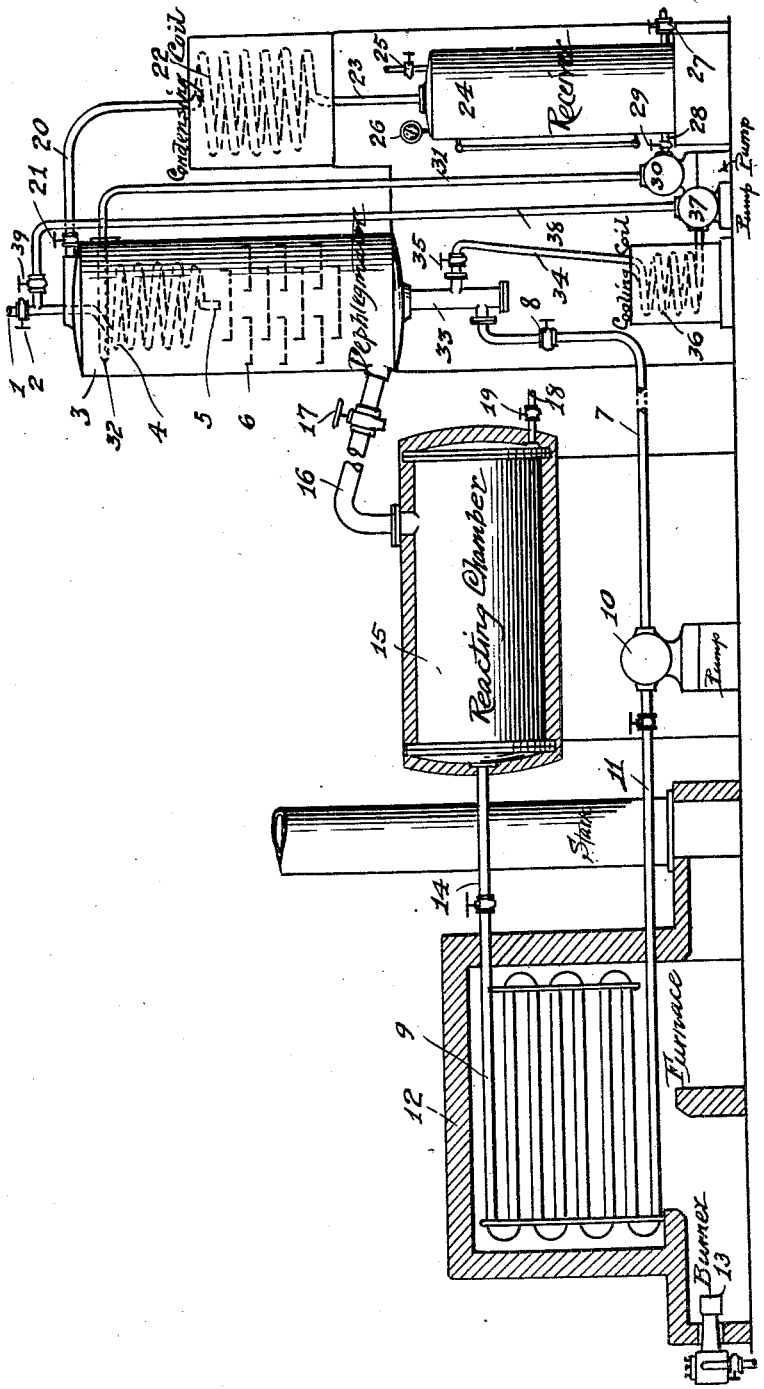
Witness,
S. T. Mann
Inventor:
Carbon P. Dubbs.
By Frank L. Belknap, Atty.

Patented Mar. 22, 1932

1,850,745

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR CONVERTING PETROLEUMS

Application filed October 24, 1921. Serial No. 509,918.

This application is a continuation in part of my co-pending application 471,619, filed May 23, 1921.

This invention relates to process and apparatus for converting petroleums and refers more particularly to a process for cracking oils to recover the lighter products having the characteristics of gasoline or the like.

Among the salient objects of the invention are to provide a process in which the oil after being heated in a heating zone, is permitted to vaporize in the reacting or vaporizing zone, the generated vapors being refluxed in a dephlegmating stage where the higher boiling point fractions are relieved therefrom; to provide a process in which the refluxing and dephlegmating operation is effected by the introduction of the raw oil thereto, the oil being circulated through the upper portion of the dephlegmating stage in a closed stream whereby the refluxing takes place through the cooling effect of the stream of raw oil; the lower portion of the refluxing stage consisting of a zone in which the raw oil is intimately intermixed with the vapors and the cooling or refluxing of the vapors taking place due to intimate contact between the vapors and raw oil particles; to provide a process in which the recirculation of the pressure distillate recovered from the generated vapors assists in dephlegmation and temperature control of the refluxing zone and a process in which distillate may be recovered of superior quality to that recovered from the common type of cracking process due to the accurate temperature regulation which may be had in the refluxing zone and the mode of recirculation of the different oil fractions; to provide an apparatus for carrying out the improved process.

The single figure is a diagrammatic side elevational view of the apparatus.

Describing briefly the apparatus in connection with the operation of the process, the raw oil is introduced through an inlet pipe 1, controlled by a valve 2, this pipe extending in the dephlegmator 3 in the form of a coil pipe 4 the coil pipe terminating near the central portion of the dephlegmator as shown at 5. The raw oil, after circulating through the coil pipe 4, is delivered into a series of pans 6 where it is intimately intermixed with the vapors which rise through the dephlegmating column. The raw oil and condensate which is separated from the vapors is collected in the bottom of the dephlegmator and is drawn off through the line 7 controlled by a valve 8 and charged to the heating tubes 9 by means of a pump 10 through the line 11. The heating coils 9 are mounted in the furnace 12, which is preferably heated by means of gas burners 13. The oil, after being raised to a cracking temperature in the heating tubes is passed through the transfer line 14 to the vaporizing chamber 15 where a greater part of the conversion takes place. The vapors generated in the reacting chamber or vaporizing zone 15 pass off through the vapor line 16 controlled by a valve 17 and are refluxed as explained by the raw oil in the dephlegmating column 3. The unvaporized oil may be drawn off as desired to maintain a proper level in the vaporizing chamber through the line 18 controlled by a valve 19. The refluxed vapors which are uncondensed on arriving at the top of the dephlegmating column pass over through the line 20 in which is interposed a valve 21 to a water condensing coil 22, from which they are delivered through the line 23 to a receiver 24. The receiver is equipped with a pressure relief valve 25, pressure gauge 26 and liquid drawoff valve 27. If desired, the pressure distillate collected in the receiver may be fed from the receiver through the drawoff line 28 controlled by a valve 29 to a pump 30 and thence charged through the line 31 to a perforated spray pipe 32 mounted within the top of the dephlegmating column. By means of this return line and spray pipe the refractory pressure distillate which collects in the receiver may be returned and sprayed into the top of the dephlegmating column to assist in the refluxing operation.

It has been common practice to introduce the raw oil directly into the top of the dephlegmator and permit it to come into direct contact with the vapors rising through the dephlegmating zone. This practice is objectionable due to the fact that the vapors are at such a higher temperature that they produce a conversion or cracking of a portion of the lighter oil fractions contained in the raw oil body. This cracking causes carbon collection in the refluxing zone and in addition, objectionable cuts of the raw oil separated near the top of the dephlegmator are carried over and condensed with the pressure distillate which is collected in the receiver. These lighter fractions disturb the uniformity of the distillate and are undesirable in many ways.

The process here explained circulates the raw oil through a closed tube in the upper portion of the refluxing column. By doing this, the vapors coming in contact with this cooler coil are subjected to a dephlegmating action but as the raw oil is enclosed, there is no conversion in the upper part of the column except that which may take place within the enclosed coil. Near the central portion of the dephlegmating column or at any desirable distance from the top, according to the refluxing action desired, the raw oil coil terminates in an open ended pipe, permitting the incoming raw oil which has been preheated in its travel through the closed coil to be delivered into the open pans or baffle plates of the column. The purpose in causing the oil to flow over pans or baffle plates is to separate and disperse the oil so that more of it comes in contact with the rising vapors. By circulating the raw oil first through a coil and then mixing it with the vapors in the lower portion of the column, the objectionable feaures of introducing the oil in a raw state directly into the top of the dephlegmator are substantially obviated, and the advantage of intermixing the raw oil and vapors which produces the most efficient heat interchange and refluxing action is attained in the lower portion of the dephlegmating column where the raw oil has been sufficiently heated to become a better dephlegmating medium.

The return of the pressure distillate and its introduction in a finely dispersed state into the top of the dephlegmator further adds to the temperature control of this zone. This refractory oil may be introduced into the top of the column due to the fact that it is very difficult to crack and would not be affected by the temperature of the vapors at this point.

A further method of recirculation is permitted by the drawing off of the liquid oil from the bottom dephlegmator well 33 through the line 34 which is controlled by a valve 35 and circulating the same through a cooling coil 36 from which the oil is charged through a pump 37 and line 38 controlled by a valve 39 into the raw oil line 1. In this manner, the raw oil and condensate may be recirculated in regulated quantities to maintain proper temperatures in the dephlegmating zone. It will be readily seen from the control obtained from the recirculation of the pressure distillate and the raw oil together with the introduction of the raw oil in the manner described, the conditions in the dephlegmating column may be accurately governed to produce the desired quality of distillate permitted to pass over from the top of the dephlegmator in the form of vapors and collected after condensation in the receiver 24.

It is recognized that the first object of a dephlegmating or refluxing column is to separate the high boiling point vapors from a mixture of high and low boiling point vapors. This procedure involves the extraction of heat from the vapors. A further object is to utilize this heat extracted from the vapors in the dephlegmator to raise the temperature of the incoming raw oil. In dephlegmation, it is desirable to reflux back those vapors which are insufficiently cracked and allow to pass over to the condenser those vapors which are sufficiently cracked or those which will produce the desired distillate in the receiver. To successfully preheat the incoming raw oil and at the same time, remove the higher boiling point vapors, it has been found that where the raw oil in the upper part of the dephlegmating column is confined to a coil positioned therein, which coil discharges the raw oil into direct contact with the vapors at about the middle of the dephlegmator, a dephlegmating action is effected but the objectionable commingling of the raw oil and vapors near the top of the dephlegmator is obviated.

The oil flowing from the lower end of the closed coil flows into perforated pans or other well known means for keeping the oil divided in a dispersed state. This results in the raw oil not coming in contact with the vapors until it has reached a zone considerably below the top of the dephlegmator and approximating the central section. From there to the bottom of the column, the raw oil comes in direct contact with the ascending vapors, thus bringing the raw oil fairly close to the temperature of the hot vapors admitted thereto. It is to be understood that the exact location of the discharge of the raw oil from the closed coil to direct contact with the vapors is determined by the relative volume of vapors to the raw oil and to the temperatures of each before being mixed. This leaves the rest of the dephlegmator for additional cooling by other means and it is found that in order to maintain the purifying reaction of the dephlegmator that the best results are obtained by taking the vapors which are condensed after passing over from the top of the dephlegmator and pump portions of this distillate back into the top of the column. In this manner, both the cooling effect of the returned distillate and the raw oil are combined to furnish a further proper dephlegmating medium. It will be further noted that such a recirculation not only avoids contaminating purified vapors with heavy boiling point products as is done where the raw oil is introduced directly into the top of the dephlegmator but avoids waste of heat, that is involved when the oil is taken out of the bottom of the dephlegmator, cooled, and then recirculated through back into the top.

The distillate which is recycled as explained is further purified by the recirculation.

Another important feature is the fact that the temperature of the vapors leaving the top of the dephlegmator can be varied without affecting the temperatures of the combined raw oil and condensed heavy vapors flowing out of the bottom of the dephlegmator, thus allowing rapid temperature changes if necessary, and eliminating the unbalancing effect upon the operation of the rest of the apparatus. This process, while particularly adaptable to the dephlegmation of hydrocarbon oils, is applicable to any ordinary refining methods where a refluxing of the vapors takes place.

I claim as my invention:

1. A process of oil conversion, consisting in maintaining a body of oil at a conversion temperature under superatmospheric pressure, in passing the evolved vapors to a dephlegmating zone wherein they are dephlegmated by being initially subjected to the cooling action of incoming charging stock in physical contact therewith, and in thereafter being subjected to the cooling action of incoming charging stock out of physical contact therewith, in condensing the dephlegmated vapors, in withdrawing preheated charging stock and reflux condensate from the dephlegmating zone, and in recirculating portions thereof to the dephlegmating zone to assist the incoming charging stock in the dephlegmating of the vapors.

2. A method of dephlegmating hydrocarbon oil vapors evolved from oil subjected to cracking conditions in a cracking process, which consists in introducing the vapors from a vaporizing zone to a dephlegmating zone, apart from the zone in which the vapors were evolved, in subjecting the vapors, during a portion of their travel through the dephlegmating zone, to the cooling action of charging oil for the cracking process, while maintained out of contact with such charging oil, in removing reflux condensate separated from the vapors from the dephlegmating zone, and in returning portions of such reflux condensate to the dephlegmating zone, to assist in the dephlegmation of the vapors therein.

3. A method of dephlegmating hydrocarbon oil vapors evolved from oil subjected to cracking conditions in a cracking process, consisting in introducing the vapors from a vaporizing zone to a dephlegmating zone, apart from the zone in which the vapors were evolved, whereby reflux condensate separated from the vapors will not commingle with unvaporized oil in said vaporizing zone, in subjecting the vapors in one portion of their travel through said dephlegmating zone to physical contact with charging oil for the cracking process, in passing the vapors in another portion of their travel through said dephlegmating zone in heat conductive relationship, but out of contact, with charging oil for the cracking process, in removing reflux condensate separated from the vapors from said dephlegmating zone, and in returning regulated portions thereof to said dephlegmating zone, to further assist in the dephlegmation of the vapors therein.

4. A method for dephlegmating hydrocarbon oil vapors evolved from oil subjected to cracking conditions in a cracking process, consisting in introducing the vapors from a vaporizing zone wherein they are evolved to a dephlegmating zone, apart from said zone in which they were evolved, and to which dephlegmating zone no unvaporized residual oil from the cracking process is admitted, in passing charging oil for the cracking process in heat transfer relationship, but out of physical contact, with the vapors in the coolest portion only of said dephlegmating zone, in removing the vapors which have passed through said coolest portion of the dephlegmating zone for final condensation, in admitting the charging oil, subsequent to its passage only through the coolest portion of the dephlegmating zone directly, to an intermediate portion of the dephlegmating zone, and in causing the same to flow at a slow velocity and in physical contact with the vapors through the hottest portion of the dephlegmating zone.

5. A method for dephlegmating hydrocarbon oil vapors evolved from oil subjected to cracking conditions in a cracking process, which consists in introducing the vapors from a zone in which they are evolved to a dephlegmating zone, apart from said zone in which they were evolved, in initially flowing incoming charging oil in heat interchange relationship, but out of contact, with the vapors only in the coolest portion of the dephlegmating zone, in thereafter introducing charging oil which has passed out of physical contact with the vapors in said coolest portion of the dephlegmating zone, into direct physical contact with the vapors in a hotter portion of the dephlegmating zone, and in causing the same to travel in direct physical contact with the vapors through successively hotter portions of the dephlegmating zone, the distance of travel of the oil in physical contact with the vapors being at least equal to the distance of travel of the vapors in heat transfer relationship, but out of contact, with the oil.

6. A method for dephlegmating hydrocarbon oil vapors evolved from oil subjected to cracking conditions in a cracking process, which consists in introducing the vapors from a zone in which they are evolved to a dephlegmating zone, apart from said zone in which they were evolved, in introducing cool oil to the dephlegmating zone, adjacent the vapor outlet therefrom, to flow out of contact with the vapors passing through the coolest portion of the dephlegmating zone, in thereafter introducing the oil, which has passed through the coolest portion of the dephlegmating zone, directly into physical contact with the vapors in a hotter portion of the dephlegmating zone, and in causing such oil to flow successively through the portions of the dephlegmating zone of increasing temperature, whereby the coolest vapors in the dephlegmating zone are in heat transfer relationship, but out of contact, with the coolest oil in the dephlegmating zone and the hottest vapors in the dephlegmating zone are in physical contact with the hottest oil in the dephlegmating zone.

CARBON P. DUBBS.